United States Patent [19]

Janson

[11] Patent Number: 4,926,733

[45] Date of Patent: May 22, 1990

[54] SAW BLADE TENSIONING ARRANGEMENT

[75] Inventor: Kurt Janson, Mariannelund, Sweden

[73] Assignee: Aktiebolaget A.K. Eriksson, Mariannelund, Sweden

[21] Appl. No.: 362,440

[22] PCT Filed: Nov. 19, 1987

[86] PCT. No.: PCT/SE87/00543

§ 371 Date: May 22, 1989

§ 102(e) Date: May 22, 1989

[87] PCT Pub. No.: WO88/03850

PCT Pub. Date: Jun. 2, 1988

[30] Foreign Application Priority Data

Nov. 27, 1986 [SE] Sweden ............................. 8605093

[51] Int. Cl.$^5$ ..................... B23D 55/10; B27B 13/08
[52] U.S. Cl. .......................................... 83/819; 83/58; 83/621; 83/818; 83/62
[58] Field of Search ................... 83/819, 818, 621, 58, 83/62, 62.1

[56] References Cited

U.S. PATENT DOCUMENTS 3,905,266 9/1975 Weavell et al. .................. 83/819

FOREIGN PATENT DOCUMENTS 596436 9/1978 U.S.S.R. ........................... 83/819

Primary Examiner—Donald R. Schran
Attorney, Agent, or Firm—Sughrue, Mion, Zinn, Macpeak & Seas

[57] ABSTRACT

A saw-blade tensioning arrangement for band saw and like machines which includes a hydraulic cylinder (6) having arranged for movement therein a piston (7) which is intended to activated saw-blade tension control means (2). The blade tension is, in this way, dependent on the hydraulic pressure in the cylinder. The arrangement includes means for pneumatically regulating the hydraulic pressure, these means including a pneumatically operated pressure booster (10) and means (19, 20, 35) for activating the pressure booster at the end of a working stroke of the hydraulic piston, therewith to tension the saw blade to the desired working tension, this working tension being determined, inter alia, by the blade width.

10 Claims, 6 Drawing Sheets

SAW BLADE TENSIONING ARRANGEMENT

The present invention relates to an arrangement which is intended for tensioning the cutting blades of band saws and like machines and which comprises a hydraulic piston-cylinder device the piston of which is intended to activate blade tension control means, such that the tension in the blade is governed by the hydraulic pressure in the cylinder of the piston-cylinder device.

In band saws which are equipped with blade tensioning facilities, e.g. the band saw described and illustrated in No. SE-7312757-3 the blade is tensioned with the aid of an hydraulically operated piston which is urged upwards by means of pump pressure, this pressure being held constant with the aid of a pressure-compensated pump and diverse pressure regulators. This in combination with a solid steel piston results in a rigid, inelastic tensioning system with no resilience or ability to absorb shock.

With the growing demand for sawing machines of higher performance levels, it has been found desirable to introduce resiliency in blade tension in order, inter alia, to be able to compensate for those changes in blade length which result from heating and cooling of the blade. No. SE-7317517-6 describes a completely gas-sprung system, which nevertheless is encumbered with certain drawbacks.

The main object of the present invention is to provide a blade tensioning arrangement which incorporates a hydraulic piston-cylinder device and with which at least the aforesaid disadvantage inherent with known hydraulic devices is eliminated.

This object is achieved in accordance with the invention by controlling the hydraulic pressure pneumatically, thereby introducing resiliency and shock absorbing facility into the system and enabling the blade tension to be regulated or controlled in a particularly simple manner.

Accordingly, this invention consists in a blade tensioning arrangement of the kind described in the introduction which is characterized in that the arrangement includes means for regulating the hydraulic pressure pneumatically; in that the regulating means include a pneumatically operated pressure booster or amplifier; and in that means are provided for activating the pressure booster at the end of a working stroke of the piston, such as to achieve the desired working tension in the saw blade.

The inventive arrangement is thus controlled solely by the pneumatics incorporated in the arrangement, therewith enabling the blade tension to be controlled and regulated in a very simple fashion, as beforementioned. Furthermore, since the hydraulic pump found in prior art blade tensioning systems has been replaced with, inter alia, a pneumatically operated pressure booster, it is possible to create a desired degree of resilience or spring in the system. It is essential that a facility is provided which will enable the blade tension of a band saw to be regulated readily and simply, since the correct blade tension is directly proportional to the blade width, which changes each time the blade is ground. Consequently, a pneumatic pressure regulator is preferably connected to the pressure booster, so as to enable the blade to be tensioned to a desired working tension and maintained at this level of tension. The use of such a pneumatic pressure regulator can be highly beneficial, among other things because it is simple to control.

In order to achieve the requisite amount of spring, or shock absorbency, in the system, an additional volume of air can be made available between the pressure booster and the pressure regulator. In accordance with a preferred embodiment of the agreement, the hydraulic piston-cylinder device has connected thereto a pressure sensor which initiates activation of the pneumatic pressure booster when the hydraulic pressure reaches a preset value.

In accordance with a particularly preferred embodiment of the invention, which provides a very compact construction of the whole blade tensioning arrangement, the hydraulic piston is hollow and the pressure booster is located within the piston and is carried by the piston during piston movement. In this case, the outlet opening of the pressure booster is preferably connected to a leadthrough in the bottom of the piston. The piston is preferably fully sealed and contains the requisite amount of oil for maneuvering the piston and also incorporates the pneumatic connections required for working air and return air.

Other characteristic features of the invention are set forth in the following claims.

The invention will now be described in more detail with reference to exemplifying embodiments illustrated in the accompanying drawings.

Figure 2:
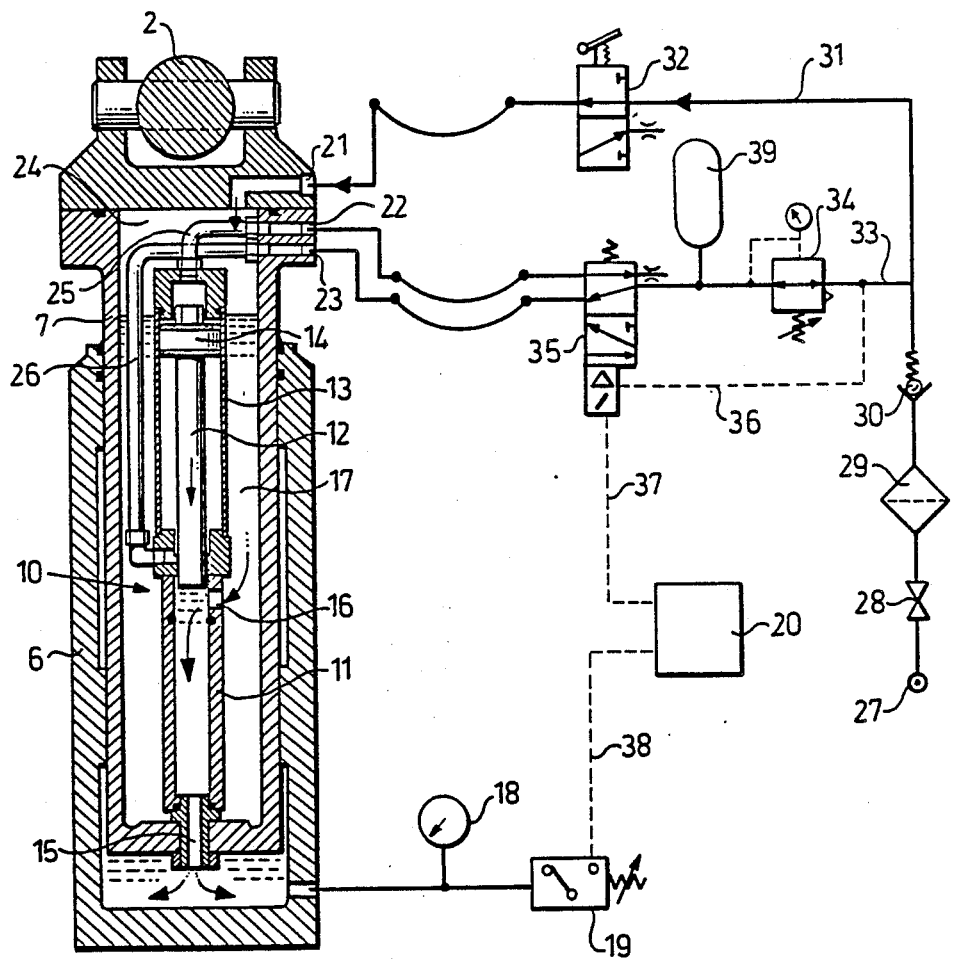
FIG. 2 is a sectional view of a hydraulic piston-cylinder device having a hollow piston and functioning as a saw stand, and also illustrates a pneumatic control circuit operative in controlling the band saw illustrated in FIG. 1.
Figure 3:
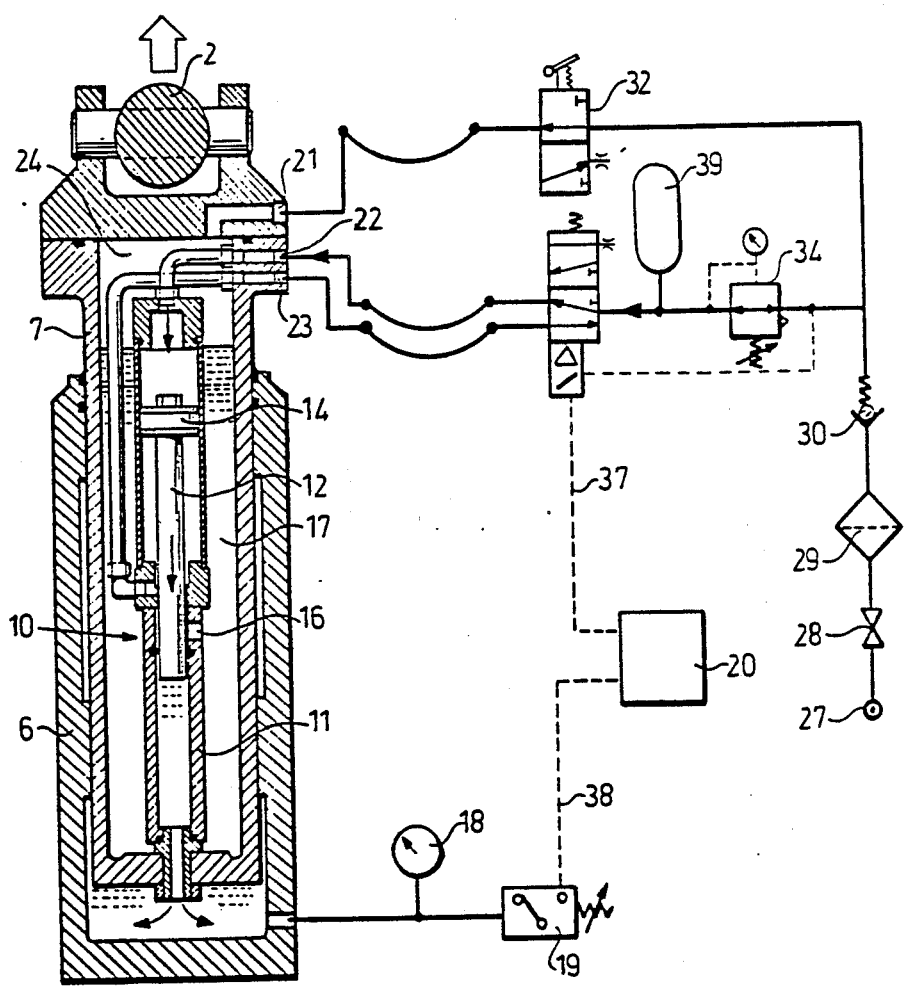
Figure 4:
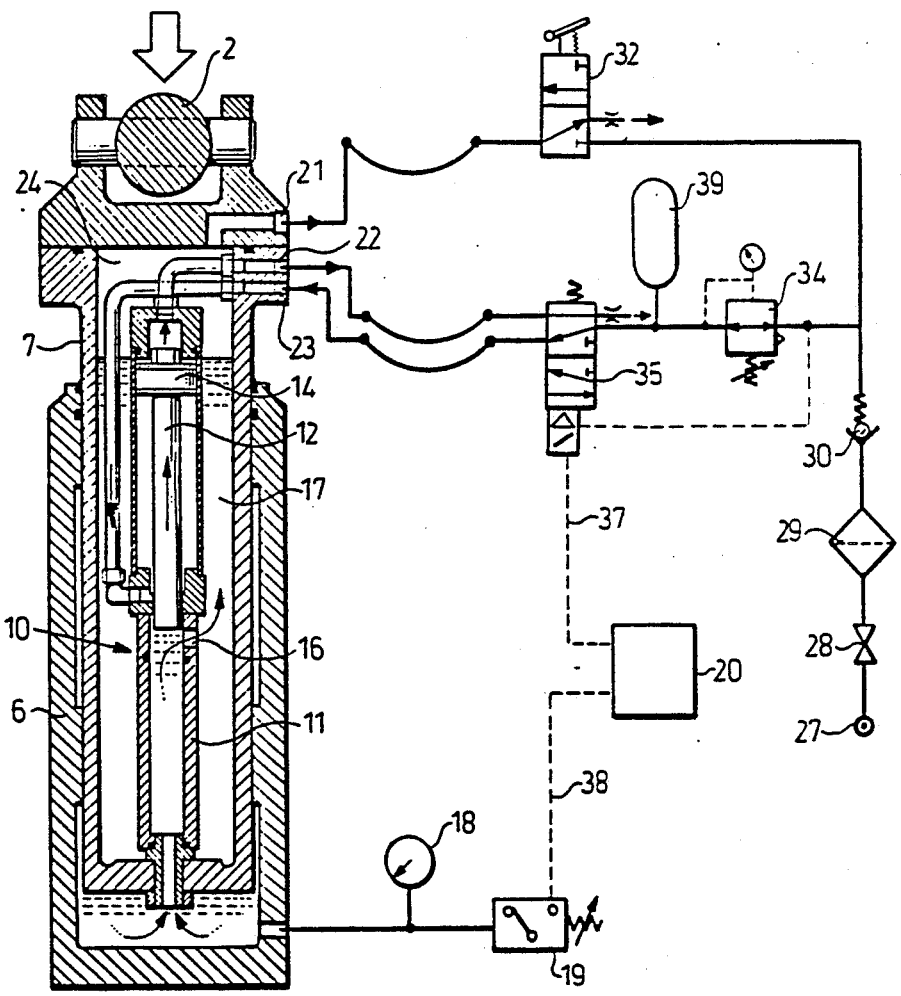

FIGS. 3 and 4 correspond to the illustration of FIG. 2, but illustrate other stages of a working cycle.

Figure 5:
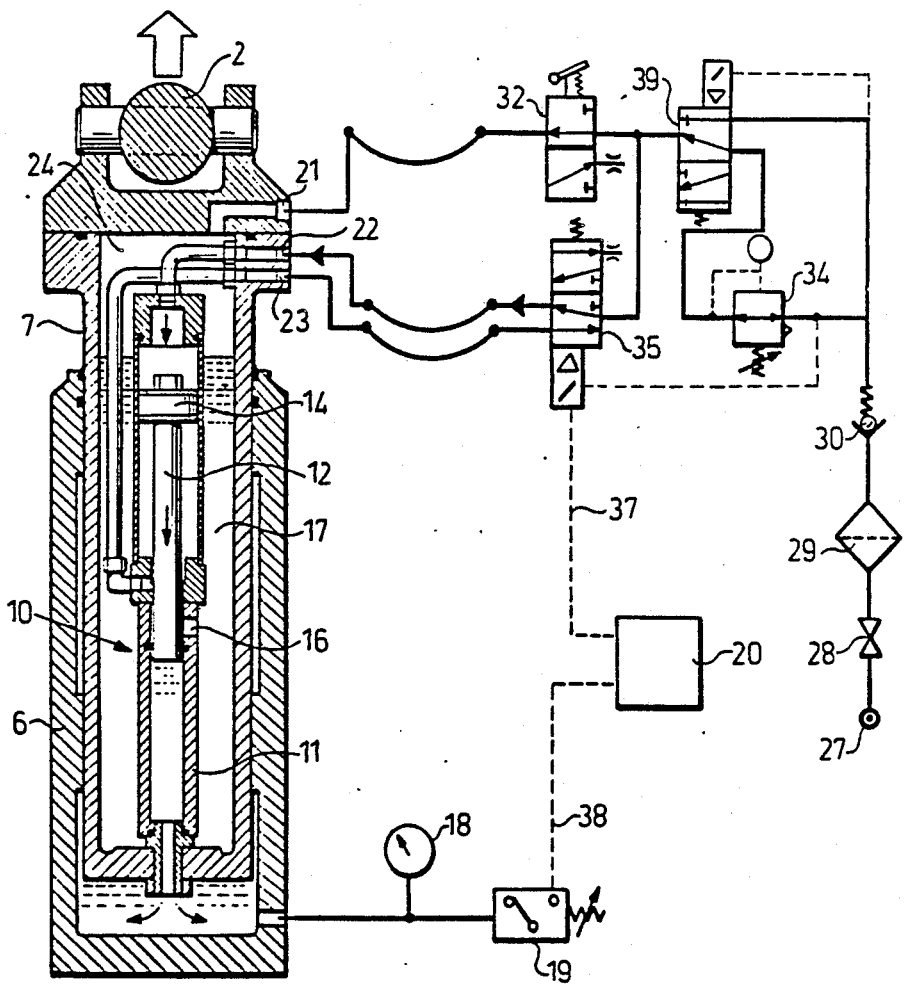

FIG. 5 illustrates an alternative embodiment of the pneumatic control circuit.

Figure 6:
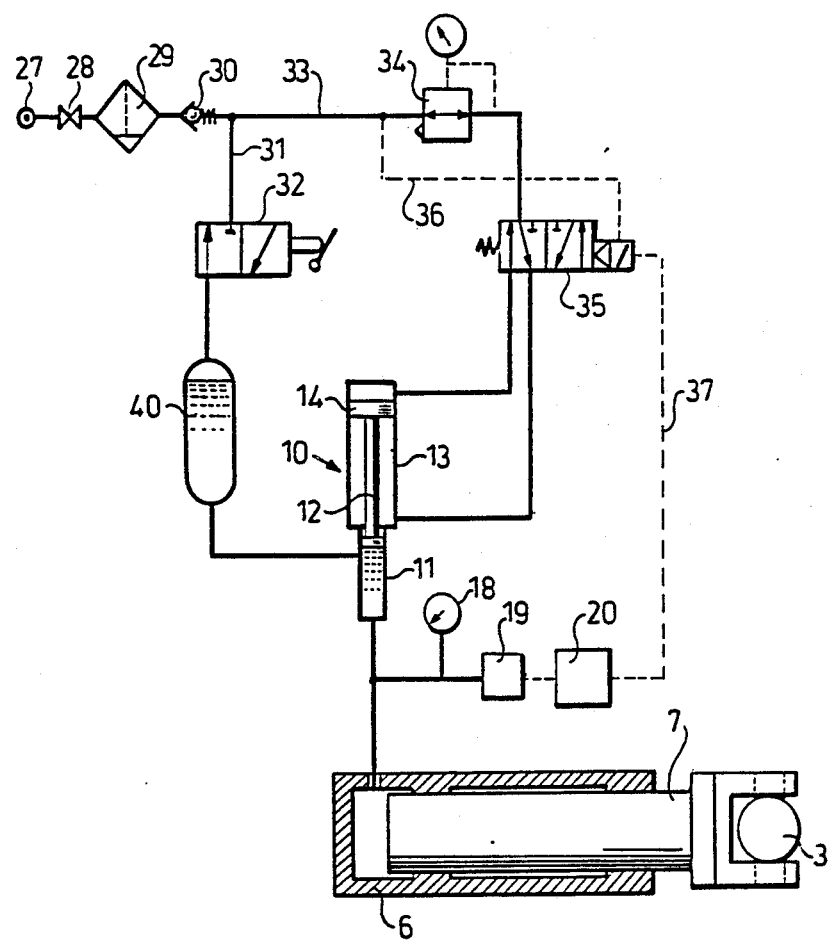

FIG. 6 illustrates another embodiment of the invention applied with a hydraulic piston-cylinder device which is positioned horizontally.

Figure 1:
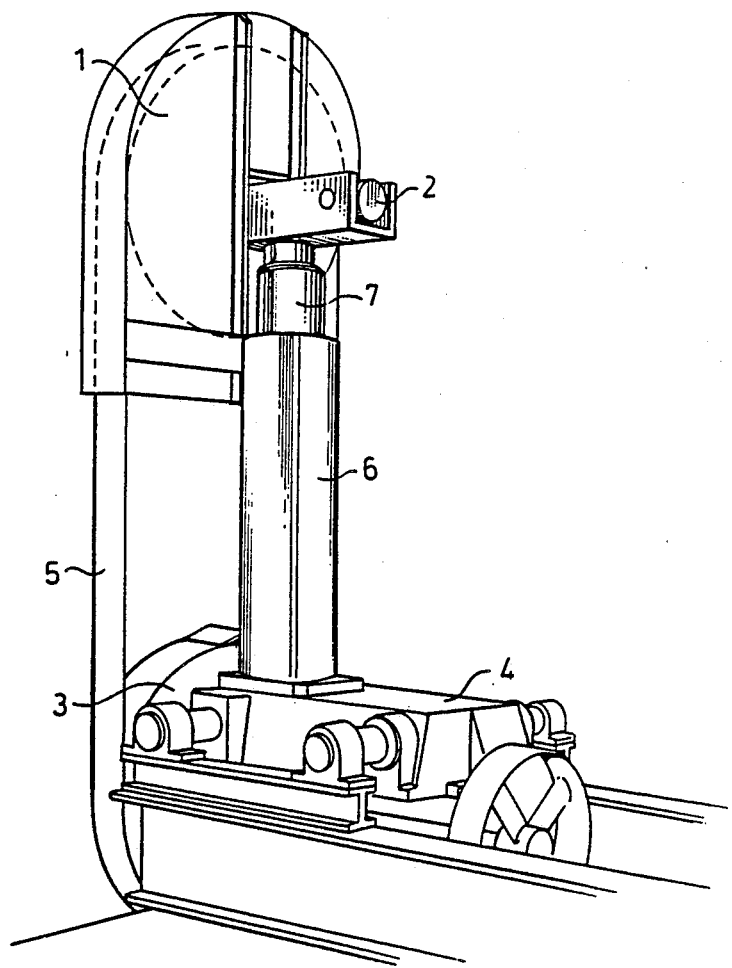
FIG. 1 illustrates schematically a band saw provided with an arrangement according to the invention.

FIG. 1 illustrates a band saw which comprises an upper saw-blade wheel 1 which is journalled on a shaft 2, and a lower saw-blade wheel 3 which is carried by a laterally adjustable mounting block 4. Extending over the blade wheels is an endless saw blade 5, the tension in the blade being adjusted by changing the distance between the blade wheels. To this end the mounting block of the band saw has the form of or incorporates a hydraulic piston-cylinder device 6, having a hydraulic piston 7 which carries the shaft 2 of the upper blade wheel 1 and which is axially movable in the cylinder.

FIG. 2 is a sectional view of the hydraulic piston-cylinder device 6, 7 which functions as a chain-saw stand and the piston 7 of which carries the shaft 2 of the upper saw-blade wheel. The hydraulic piston 7 is hollow and has arranged therein a pneumatically operated pressure booster 10 comprising a cylindrical high pressure part 11, into which a rod-like plunger 12 is driven with the aid of a further plunger 14 which, in turn, is driven into the low-pressure part 13 of the pressure booster and which has a larger piston-area than the rod-like plunger 12. Arranged in the lower end surface of the cylinder 11 is an opening which communicates directly with a leadthrough 15 extending through the bottom surface of the hydaulic piston 7. The reference 16 identifies a through-flow passage in the upper end of the high-pressure cylinder 11. The piston 7, the high-pressure cylinder 11 and the hydraulic cylinder 6 are filled with oil 17, the pressure of which is measured by means of a manometer 18. The reference numeral 19 identifies a so-called pressostat, which is intended to send a signal to a relay unit 20, over a signal conductor 38 when detecting a pre-determined pressure. Further, it gives an alarm signal in case of a pressure drop.

The references 21, 22 and 23 identify three pneumatic connections on the piston 7, of which connections the connection 21 communicates with a space 24 formed above the surface of the oil 17 in the piston 7, whereas the connection 22 communicates, through a pipe 25, with the space above the plunger 14 in the low-pressure part of the pressure booster 10. The pneumatic connection 23 communicates with the lower part of the low-pressure part 13, through a pipe 26.

The reference 27 identifies a connection to an air pressure circuit or network, where reference 28 identifies a closure valve, reference 29 identifies an air filter and reference 30 identifies a non-return valve. Extending from the non-return valve 30 is a first conduit 31 which extends to the air connection 21 via a three-path valve 32, while a second conduit 33 is connected to a secondary, ventilated pressure regulator 34, which can be placed in communication with respective pneumatic connections 22 and 23 via a pressure-controlled solenoid valve 35. Reference 36 identifies an operating pressure conduit for the valve 35 and the reference 37 identifies a signal conductor extending from the relay unit 20 to the valve 35.

In order to achieve improved resilience and shock absorbency in the system, an auxiliary air source 39 can be connected between the valve 35 and the pressure regulator 34.

With the band saw in the illustrated operational state it is assumed that the upper saw-blade wheel shall be raised from a lowered position to the working position, for example after having changed the saw blade. The upper wheel is raised by switching the valve 32 to the position shown in the Figure, whereupon compressed air from the network 27 is supplied to the space 24 above the oil 17 in the piston 7. The oil will therewith flow through the free flow passage 16 in the high-pressure part of the pressure booster 10 and through the leadthrough 15 to the under surface of the piston 7, where it exerts a lifting pressure on the piston which consequently lifts the upper saw-blade wheel to its working position.

When the solenoid valve 35 is set to the position illustrated in FIG. 2, the space above the plunger 14 in the low-pressure part of the pressure booster is ventilated and the plunger 14 is urged to its upper position by compressed air supplied to the connection 23, such as to uncover the throughflow passage 16 in the high-pressure part of the pressure booster.

The pressure booster 10, however, must be activated in order to tension the saw blade to the high level of working tension required. The pressure booster 10 is activated when the hydraulic pressure in the cylinder 6, engendered by the compressed air and measured by means of the manometer 18, has reached a value pre-set on the pressostat 19. When this pressure is reached, the pressostat sends a signal along the conductor 38 to the relay unit 20, which in turn sends a switching signal to the solenoid valve 35.

When the solenoid valve 35 is switched to the position illustrated in FIG. 3, air under pressure, set by the pressure regulator 34, is supplied to the space above the plunger 14, through the connection 22, at the same time as the space below the undersurface of the piston is ventilated through the connection 23. As the plunger 14 is pressed down, the rod-like plunger 12 will close the throughflow passage 16 and extend into the high-pressure part 11 of the pressure booster 10, therewith increasing the pressure of the oil in the cylinder 6, which corresponds to the ratio between the cross-sectional areas of the plungers 14 and 12. This increased hydraulic pressure results in final tensioning of the saw blade to a value corresponding to the pressure set on the pressure regulator 34.

As will be understood from the aforegoing, the whole of the tensioning sequence can be effected without using jacks or hydraulic pumps, by controlling the hydraulic pressure in the cylinder 6 pneumatically. This facility is highly beneficial, since, inter alia, it enables the use of relatively simple components and air control systems. The aforedescribed arrangement is also extremely compact and requires hardly any additional space, since the pressure booster can be incorporated in the hollow piston forming part of the band saw stand. The presence of air on the upper side of the plunger 14 also imparts a degree of resilience, i.e. spring, to the system, which resilience can be enhanced by introducing additional air into the system from the auxiliary air source 39, as illustrated.

When wishing to relax the saw blade, e.g. when making a blade change, the settings of the solenoid valve 35 and the valve 32 are reversed, as illustrated in FIG. 4. The plunger 14 and the rod-like plunger 12 will then be lifted, so as to expose the throughflow channel 16 and permit oil to flow up from the cylinder 6 through the high-pressure part of the pressure booster 11. The spaces above the plunger 14 and above the oil in the piston 7 are ventilated through respective valves. The piston 7 and the upper saw-blade wheel can then be lowered, wherewith the speed at which the saw-blade wheel is lowered can be controlled by throttling the return air in the valve 32.

Instead of utilizing an auxiliary air supply for achieving the desired amount of spring in the system, the air volume 24 above the oil level in the piston 7 can be used in accordance with the FIG. 5 illustration, which corresponds to the state illustrated in FIG. 3, wherewith corresponding components are identified with the same reference numerals as those used in the preceding Figures. The FIG. 5 embodiment incorporates an additional solenoid valve 39 which enables a switch to be made between non-reduced pressure and reduced pressure via the pressure regulator 34. Because this enables a direct connection to be used between the valves 32 and 35, the volume of air located above the oil level in the piston 7 in the illustrated high-pressure case will be incorporated in the system and therewith afford the requisite resiliency.

In order to provide an indication of unacceptable leakage of hydraulic oil from the system, the plunger 14 in the pressure booster may be magnetic or provided with a magnetic part, such that it is able to initiate an alarm signal should the plunger sink beneath a pre-determined level. This is an essential safety facility. The aforementioned non-return valve 30 in the air supply system is also provided for safety reasons, in order to prevent accidents should the air supply suddenly cease.

In those cases when the piston according to the invention is not incorporated in the saw stand, or when there is used a recumbent hydraulic cylinder, the alternative embodiment of the invention illustrated schematically in FIG. 6 can be used. Corresponding components in FIG. 6 are identified with the same reference numerals as those used in preceding Figures. It will be seen from FIG. 6 that the pressure booster 10 of this embodiment is not incoporated in the piston 7 but has the form of a separate component. Since the piston 7 no longer serves as a pressure vessel, it is necessary to provide an outer pressure vessel 40 which contains oil and which can be placed under pressure with the aid of compressed air from the air supply 27, by setting the valve 32.

It will be understood by those skilled in this art that the method of operation of the FIG. 6 embodiment is the same as that of the earlier described embodiment. It will also be understood that an auxiliary air supply can be provided if desired from the aspect of system resiliency.

The invention has been described in the aforegoing with reference to a number of preferred embodiments illustrated in the drawing. It will be understood, however, that these embodiments may be modified within the scope of the following claims, particularly with regard to the pneumatic part of the system. For example, the pressure regulator can be adjusted more or less automatically in dependence on the blade tension required, which in turn is determined, for instance, by the prevailing blade width.

I claim:

1. A saw-blade tensioning arrangement for band saws and like machines, including a hydraulic cylinder (6) having movably arranged therein a piston (7) which is intended to activate saw-blade tension regulating means (2), so that the blade tension becomes dependent on the hydraulic pressure in the cylinder (6), characterized by means for pneumatically controlling the hydraulic pressure, these means including a pneumatically operated pressure booster (10), and means (19, 20, 35) for activating the pressure booster (10) at the end of a working stroke of the hydraulic piston (7), so as to tension the saw blade (5) to a desired working tension.

2. An arrangement according to claim 1, characterized by a pneumatic pressure regulator (34) which is connected to the pressure booster (10) for adjusting the saw blade (5) to a desired working tension and for maintaining the saw blade at the set tension level.

3. An arrangement according to claim 2, characterized in that an auxiliary air volume (39) is connected between the pressure booster (10) and the pressure regulator (34) in order to enhance the resiliency of the tensioning arrangement.

4. An arrangement according to any of claims 1-3, characterized by a pressure sensor (19) which is connected to the hydraulic cylinder (6) and which is intended to initiate activation of the pneumatic pressure booster (10) when the hydraulic pressure has reached a pre-set value.

5. An arrangement according to claim 1, characterized in that the hydraulic piston (7) is hollow, and in that the pressure booster (10) is incorporated in the piston and is carried thereby during piston movement.

6. An arrangement according to claim 5, characterized in that the outlet opening of the pressure booster (10) is connected to a leadthrough (15) in the bottom of the piston (7).

7. An arrangement according to claim 5, characterized in that the piston (7) is sealed and contains the amount of oil (17) required for the operation of the piston and that the piston (7) is provided with connections (21, 22, 23) for working air and return air.

8. An arrangement according to claim 7, characterized by means (32) for supplying working air to an air space (24) above the oil (17) in the piston (7), means (16, 15) for permitting oil to be pressed out on the underside of the piston (7) through the high-pressure part (11) of the inactive pressure booster (10), such as to cause the piston (7) to execute a low-pressure stroke controlled by said oil of a pressure corresponding to the air pressure of said air space (24).

9. An arrangement according to claim 7, characterized by means (34, 35) for supplying working air of pre-set pressure to the pressure booster (10), and that the pressure booster is provided with means (14, 12, 15) by means of which oil at elevated pressure is pressed out on the underside of the piston (7), therewith to cause the piston to execute its high-pressure stroke.

10. An arrangement according to claim 1, characterized by monitoring means for establishing when a plunger (12) incorporated in the pressure booster (10) sinks beneath a pre-set level.

* * * * *